United States Patent
Puehse et al.

(10) Patent No.: US 11,093,993 B2
(45) Date of Patent: Aug. 17, 2021

(54) SYSTEMS AND METHODS FOR PROVIDING USER SPECIFIC DATA

(71) Applicant: MASTERCARD ASIA/PACIFIC PTE. LTD., Singapore (SG)

(72) Inventors: Tobias Puehse, Singapore (SG); Ting Shiuan Loh, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 180 days.

(21) Appl. No.: 16/240,302

(22) Filed: Jan. 4, 2019

(65) Prior Publication Data

US 2019/0220915 A1 Jul. 18, 2019

(30) Foreign Application Priority Data

Jan. 15, 2018 (SG) .......................... 10201800343Q (51) Int. Cl.
*G06Q 30/02* (2012.01)
*G06Q 30/06* (2012.01)

(52) U.S. Cl.
CPC ..... *G06Q 30/0631* (2013.01); *G06Q 30/0255* (2013.01); *G06Q 30/0283* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 8,234,375 | B2* | 7/2012 | Ghadialy | G06Q 30/0251 709/225 |
| 8,350,675 | B2* | 1/2013 | Riechel | G06K 17/0022 340/10.1 |
| 8,965,109 | B2* | 2/2015 | Wang | H04N 5/202 382/154 |
| 8,972,189 | B2* | 3/2015 | Anbalagan | G01C 21/3476 701/540 |

(Continued)

OTHER PUBLICATIONS

Chen, H.J., "What drives consumers' mobile shopping? 4Ps or shopping preferences?" Asia Pacific Journal of Marketing and Logistics, 30.4, pp. 797-815, Emerald Group Publishing, 2018. (Year: 2018).*

*Primary Examiner* — Nicholas D Rosen
(74) *Attorney, Agent, or Firm* — Talem IP Law, LLP (57) ABSTRACT

An apparatus for providing user specific data to a user includes a computer processor and a data storage device, the data storage device comprising instructions operative by the processor to: analyze user data associated with the user to determine a set of user frequented merchants for the user, each user frequented merchant having an associated merchant identifier; analyze the user data associated with the user to determine a set of user preference items for the user; look up inventory data for each merchant in the set of user frequented merchants, using the merchant identifier, and determine user specific merchant information from the inventory data, the user specific merchant information comprising information for each of the user preference items at that merchant; analyze the user specific merchant information for each of the merchants to determine a user recommendation indication; and transmit the user recommendation indication to a device associated with the user.

15 Claims, 5 Drawing Sheets

(56) References Cited

U.S. PATENT DOCUMENTS

| | | | |
|---|---|---|---|
| 9,092,773 B2* | 7/2015 | Daly | G06Q 20/209 |
| 10,002,378 B2* | 6/2018 | Argue | G06Q 30/0633 |
| 10,776,854 B2* | 9/2020 | Noguchi | G06Q 30/0631 |
| 2007/0150588 A1* | 6/2007 | Ghadialy | G06Q 30/02 |
| | | | 709/224 |
| 2010/0306080 A1* | 12/2010 | Trandal | G06Q 10/10 |
| | | | 705/26.8 |
| 2011/0267172 A1* | 11/2011 | Riechel | G06K 17/0022 |
| | | | 340/10.1 |
| 2014/0006198 A1* | 1/2014 | Daly | G06Q 30/06 |
| | | | 705/24 |
| 2014/0037190 A1* | 2/2014 | Wang | H04N 13/122 |
| | | | 382/154 |
| 2014/0121967 A1* | 5/2014 | Anbalagan | G06Q 30/0633 |
| | | | 701/540 |
| 2014/0172559 A1* | 6/2014 | Caiman | G06Q 30/0261 |
| | | | 705/14.53 |
| 2014/0180865 A1* | 6/2014 | Argue | G06Q 30/0633 |
| | | | 705/26.7 |
| 2015/0032543 A1* | 1/2015 | Weis | G06Q 30/0261 |
| | | | 705/14.58 |
| 2016/0034961 A1* | 2/2016 | May | G06Q 30/0261 |
| | | | 705/14.58 |
| 2017/0364991 A1* | 12/2017 | Noguchi | G06Q 30/0643 |
| 2019/0180221 A1* | 6/2019 | Greenberger | G06Q 10/087 |

* cited by examiner

SYSTEMS AND METHODS FOR PROVIDING USER SPECIFIC DATA

TECHNICAL FIELD AND BACKGROUND

The present disclosure relates to data processing and specifically to the provision of user specific data by interrogating multiple data sources such as transaction data and real-time or near real-time inventory data.

Intelligent in-store planning and inventory systems are able to provide detailed and up-to date information such as the availability of products; locations of products in a physical store; pricing of products and other information. This data is typically captured by a combination of autonomous systems such as fetch robots, and image recognition technology.

This information could potentially be of great interest and value to consumers, however, because of the volume of data and its arrangement which is on a merchant level is it difficult to present this data to consumers.

BRIEF SUMMARY

In general terms, the present disclosure proposes systems and methods which channel the information discussed above to provide consumers with information on items of interest to them (user preference items) at merchants that they visit (user frequented merchants). In some aspects of the present disclosure, the user frequented merchants are determined from transaction data for a payment card associated with the user and the user preference items may be identified by information such as images captured by the user. In the systems and methods of the disclosure the user preference items are matched with data from the inventory data for the user frequented merchants to provide the user with information on availability of items and recommendations of merchants to visit from among the user frequented merchants.

According to a first aspect of the present disclosure, an apparatus for providing user specific data to a user is provided. The apparatus comprises: a computer processor and a data storage device, the data storage device having a user frequented merchant determination module; a user preference item determination module; a merchant inventory data look up module; a user specific merchant information determination module; a user specific merchant information analysis module; and a user device communication module comprising instructions operative by the processor to: analyze user data associated with a user to determine a set of user frequented merchants for the user, each user frequented merchant having an associated merchant identifier; analyze the user data associated with the user to determine a set of user preference items for the user; look up inventory data for each merchant in the set of user frequented merchants, using the merchant identifier, and determine user specific merchant information from the inventory data, the user specific merchant information comprising information for each of the user preference items at that merchant; analyze the user specific merchant information for each of the merchants to determine a user recommendation indication; and transmit the user recommendation indication to a device associated with the user.

In an embodiment the user specific merchant information comprises price information for each of the user preference items at a merchant, and wherein the user specific merchant information analysis module further comprises instructions operative by the processor to analyze the user specific merchant information to determine a recommendation indication by determining a merchant from the set of user frequented merchants with an optimized price for the set of user preference items.

In an embodiment, the user specific merchant information comprises availability information for each of the user preference items at a merchant.

In an embodiment, the user data comprises transaction data for a payment card associated with the user, and wherein the user specific merchant information analysis module further comprises instructions operative by the processor to analyze the user data to determine a set of user frequented merchants for the user by extracting merchant identifiers from the transaction data.

In an embodiment, the user device communication module further comprising instructions operative by the processor to receive user preference item indications from the device associated with the user and wherein the user data comprises the user preference item indications.

In an embodiment, the user preference item indications comprise images of items and wherein the user preference item determination module further comprises instructions operative by the processor to analyze the user data to determine a set of user preference items for the user by applying an image recognition algorithm to the images to determine item identifiers from the images.

According to a second aspect of the present disclosure, an apparatus for providing user specific data relating to a user frequented merchant to a user is provided. The apparatus comprises: a computer processor and a data storage device, the data storage device having a user preference item determination module; a merchant inventory data look up module; a user specific merchant information determination module; a user specific merchant information analysis module; and a user device communication module comprising instructions operative by the processor to: analyze the user data associated with the user to determine a set of user preference items for the user; look up inventory data for the user frequented merchant using a merchant identifier associated with the user frequented merchant and determine user specific merchant information from the inventory data, the user specific merchant information comprising information for each of the user preference items at that merchant; analyze the user specific merchant information for the user frequented merchant to generate a user alert; and transmit the user alert to a device associated with the user.

In an embodiment, the user specific merchant information analysis module further comprises instructions operative by the processor to analyze the user specific merchant information for the user frequent merchant by identifying an item from the set of user preference items which is out of stock at the merchant and the user alert comprises an identifier of that item.

In an embodiment, the user specific merchant information analysis module further comprises instructions operative by the processor to analyze the user specific merchant information for the user frequent merchant by identifying a change in status of an item from the set of user preference items the merchant and the user alert comprises an identifier of that item.

In an embodiment, the change in status is a change in price of the item at the merchant.

In an embodiment, the user device communication module further comprising instructions operative by the processor to receive user preference item indications from the device associated with the user and wherein the user data comprises the user preference item indications.

In an embodiment, the user preference item indications comprise images of items and wherein the user preference item determination module further comprises instructions operative by the processor to analyze the user data to determine a set of user preference items for the user comprises applying an image recognition algorithm to the images to determine item identifiers from the images.

According to a third aspect of the present disclosure, an apparatus for providing user specific data relating to a user frequented merchant to a user is provided. The apparatus comprises: a computer processor and a data storage device, the data storage device having a user preference item determination module; a merchant inventory data look up module; and a user device communication module comprising instructions operative by the processor to: analyze the user data associated with the user to determine a set of user preference items for the user; look up inventory data for the user frequented merchant using a merchant identifier associated with the user frequented merchant, the inventory data comprising item image data, the item image data comprising images corresponding to items of the user preference items; and transmit the item image data to a device associated with the user.

According to a fourth aspect of the present disclosure, an apparatus for providing user specific data relating to a user frequented merchant to a user is provided. The apparatus comprises: a computer processor and a data storage device, the data storage device having a user preference item determination module; a merchant inventory data look up module; a shelf rendering image generation module and a user device communication module comprising instructions operative by the processor to: analyze the user data associated with the user to determine a set of user preference items for the user; look up inventory data for the user frequented merchant using a merchant identifier associated with the user frequented merchant to the inventory data comprising item image data and item placement data, the item image data comprising images corresponding to items of the user preference items, the item placement data indicating the locations of the user preference items within the merchant; generate shelf rendering image data using the item placement data and the item image data; and transmit the shelf rendering image data to a device associated with the user.

According to a fifth aspect of the present disclosure, a data processing method of providing user specific data to a user is provided. The method comprises: analyzing, in a user frequented merchant determination module, user data associated with a user to determine a set of user frequented merchants for the user, each user frequented merchant having an associated merchant identifier; analyzing, in a user preference item determination module, the user data associated with the user to determine a set of user preference items for the user; for each merchant in the set of user frequented merchants, using the merchant identifier to look up inventory data for that merchant and determining user specific merchant information from the inventory data, the user specific merchant information comprising information for each of the user preference items at that merchant; analyzing, in a user specific merchant information determination module, the user specific merchant information for each of the merchants to determine a user recommendation indication; and transmitting the user recommendation indication to a device associated with the user.

According to a sixth aspect of the present disclosure, a data processing method of providing user specific data to a user relating to a user frequented merchant is provided. The method comprises: analyzing, in a user preference item determination module, user data associated with the user to determine a set of user preference items for the user; using a merchant identifier associated with the user frequented merchant to look up inventory data for the user frequented merchant and determining user specific merchant information from the inventory data, the user specific merchant information comprising information for each of the user preference items at that merchant; analyzing, in a user specific merchant information determination module, the user specific merchant information for the user frequented merchant to generate a user alert; and transmitting the user alert to a device associated with the user.

In an embodiment, analyzing the user specific merchant information for the user frequent merchant comprises identifying an item from the set of user preference items which is out of stock at the merchant and the user alert comprises an identifier of that item.

In an embodiment, analyzing the user specific merchant information for the user frequent merchant comprises identifying a change in status of an item from the set of user preference items the merchant and the user alert comprises an identifier of that item.

In an embodiment, the change in status is a change in price of the item at the merchant.

In an embodiment, the method further comprises receiving user preference item indications from the device associated with the user and wherein the user data comprises the user preference item indications.

In an embodiment, the user preference item indications comprise images of items and wherein analyzing the user data to determine a set of user preference items for the user comprises applying an image recognition algorithm to the images to determine item identifiers from the images.

According to a seventh aspect of the present disclosure, a data processing method of providing user specific data to a user relating to a user frequented merchant is provided. The method comprises: analyzing in a user preference item determination module, user data associated with the user to determine a set of user preference items for the user; using a merchant identifier associated with the user frequented merchant to look up inventory data for the user frequented merchant, the inventory data comprising item image data, the item image data comprising images corresponding to items of the user preference items; and transmitting the item image data to a device associated with the user.

According to an eighth aspect of the present disclosure, a data processing method of providing user specific data to a user relating to a user frequented merchant is provided. The method comprises: analyzing in a user preference item determination module, user data associated with the user to determine a set of user preference items for the user; using a merchant identifier associated with the user frequented merchant to look up inventory data for the user frequented merchant, the inventory data comprising item image data and item placement data, the item image data comprising images corresponding to items of the user preference items, the item placement data indicating the locations of the user preference items within the merchant; generating, in a shelf rendering image generation module, shelf rendering image data using the item placement data and the item image data; and transmitting the shelf rendering image data to a device associated with the user.

According to a yet further aspect, there is provided a non-transitory computer-readable medium. The computer-readable medium has stored thereon program instructions for causing at least one processor to perform operations of a method disclosed above.

BRIEF DESCRIPTION OF THE DRAWINGS

Embodiments of the invention will now be described for the sake of non-limiting example only, with reference to the following drawings in which.

DETAILED DESCRIPTION

Figure 1:
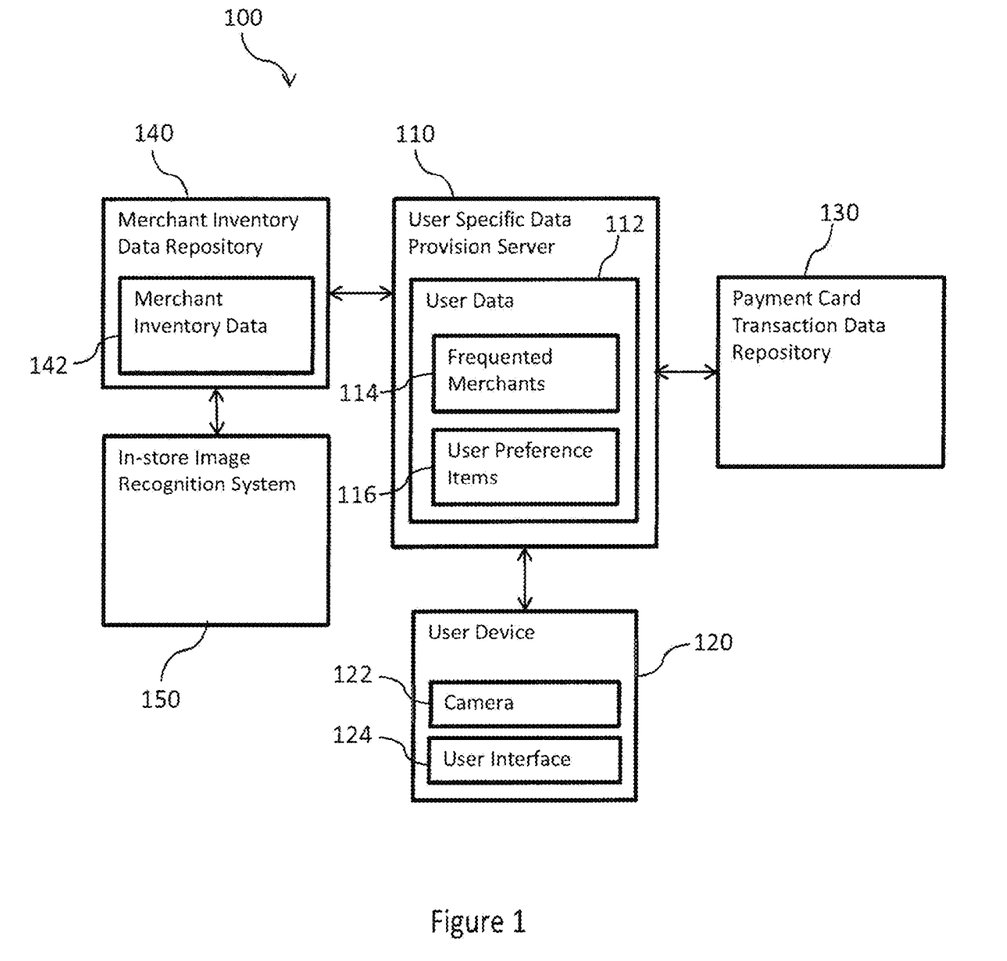
FIG. 1 is a block diagram showing a system for providing user specific data according to an embodiment of the present invention.

FIG. 1 is a block diagram showing a system for providing user specific data according to an embodiment of the present invention. The system 100 comprises a user specific data provision server 110, a user device 120, a payment card transaction data repository 130, a merchant inventory data repository 140 and an in-store image recognition system 150. Communication between the servers and devices in the system 100 may take place via any type of network, for example, a virtual private network (VPN), the Internet, a local area and/or wide area network (LAN and/or WAN), and so on.

The user specific data provision server 110 stores user data 112. The user data 112 comprises indications of user frequented merchants 114 and indications of user preference items 116. The indications of user frequented merchants 114 may be merchant identifiers determined from transaction data for a payment card associated with the user. The indications of user preference items 116 may comprise item identifiers such as stock keeping units (SKUs) for items which the user has input. The indications of user preference items may also comprise images captured by the user of the items.

The user device 120 is a portable computing device such as a smart phone or tablet device. The user device 120 has a camera 122 which can capture images, for example, of items which the user wishes to designate as user preference items. The user device 120 has a user interface such as a touch screen display which allows the user to input commands and information and also allows information to be displayed or presented to the user.

The payment card transaction data repository 130 stores payment card transaction data. The payment card transaction data repository may be associated with a payment network such as the Banknet payment network operated by Mastercard. As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Furthermore, the "payment card" may exist only as a data structure (i.e. without physical existence), which is registered with a digital wallet or cloud wallet.

The payment card transaction data stored in the payment card transaction data repository 130 comprises transaction data having a plurality of data fields or data elements. These data elements may be as defined by the ISO8583 standard. The data elements may include a merchant identifier, and indications of the transaction date, time and amount.

The merchant inventory data repository 140 stores merchant inventory data 142. The merchant inventory data 142 is stored for a plurality of merchants or stores with a merchant identifier which may correspond to the merchant identifier for the given store in the payment card transaction data. The merchant inventory data 142 may also comprise indications of item identifiers such as stock keeping units (SKUs), indications of the shelf placements of items within the store, indications of remaining stock levels or the items or indications that items are out of stock, pricing information for the items, sales velocity information, and additional information.

The in-store image recognition system 150 may comprise an autonomous system such as a robot that travels around the store and captures images. These images are then analyzed by the in-store image recognition system 150 to determine information which is transferred to the merchant inventory data repository.

The merchant inventory data 142 stored in the merchant inventory data repository 140 may also be added by other systems such as an inventory management system.

Figure 2:
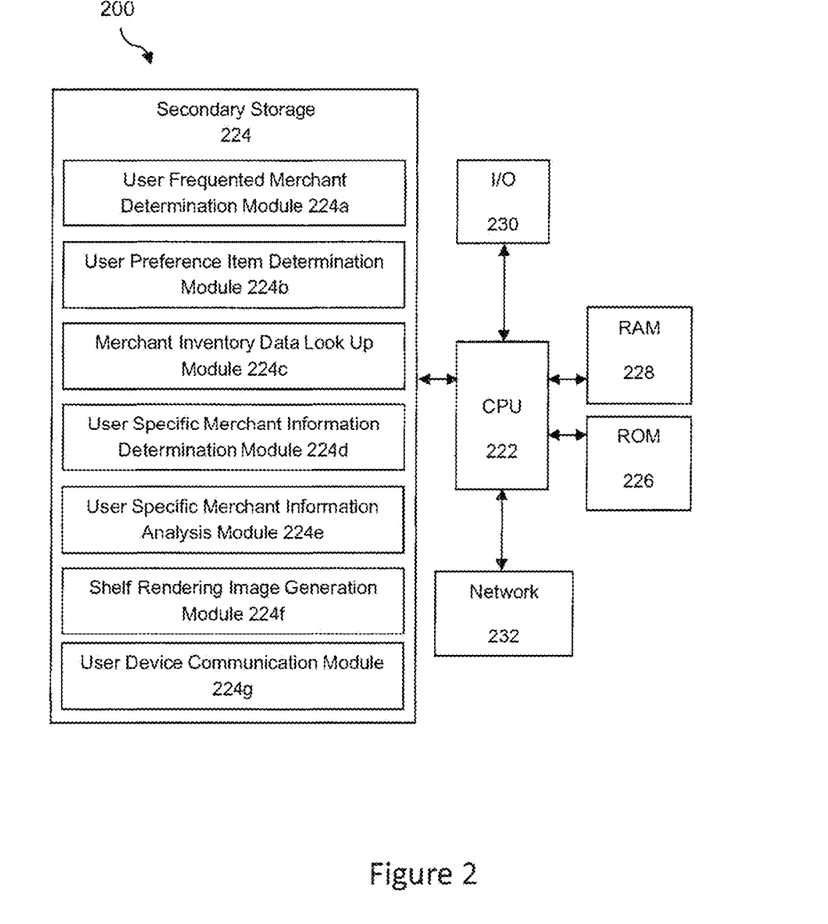
FIG. 2 is a block diagram illustrating a technical architecture of a user specific data provision server according to an embodiment of the present invention.

FIG. 2 is a block diagram showing a technical architecture 200 of the user specific data provision server 110 for performing steps of exemplary methods 300, 400, 500 and 600, which are described below with reference to FIGS. 3, 4, 5 and 6, respectively. Typically, the methods 300, 400 and 500 are implemented by a number of computers each having a data-processing unit. The block diagram as shown in FIG. 2 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 220 may further comprise input/output (I/O) devices 230, and network connectivity devices 232.

The secondary storage 224 is typically comprised of one or more disk drives, solid-state drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a user frequented merchant determination module 224a, a user preference item determination module 224b, a merchant inventory data look up module 224c, a user specific merchant information determination module 224d, a user specific merchant information analysis module 224e, a shelf rendering image generation module 224f and a user device communication module 224g comprising non-transitory instructions operative by the processor 222 to perform various operations of the method of the present disclosure. As depicted in FIG. 2, the modules 224a-224g are distinct modules which perform respective functions implemented by the user specific data provision server 110. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224g is described herein, these may alternatively be implemented as one or more hardware modules (such as field-programmable gate array(s) or application-specific integrated circuit(s)) comprising circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the method operations described herein. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Various operations of an exemplary method 300 will now be described with reference to FIG. 3 in respect of providing a user recommendation of a merchant. It should be noted that enumeration of operations is for purposes of clarity and that the operations need not be performed in the order implied by the enumeration.

Figure 3:
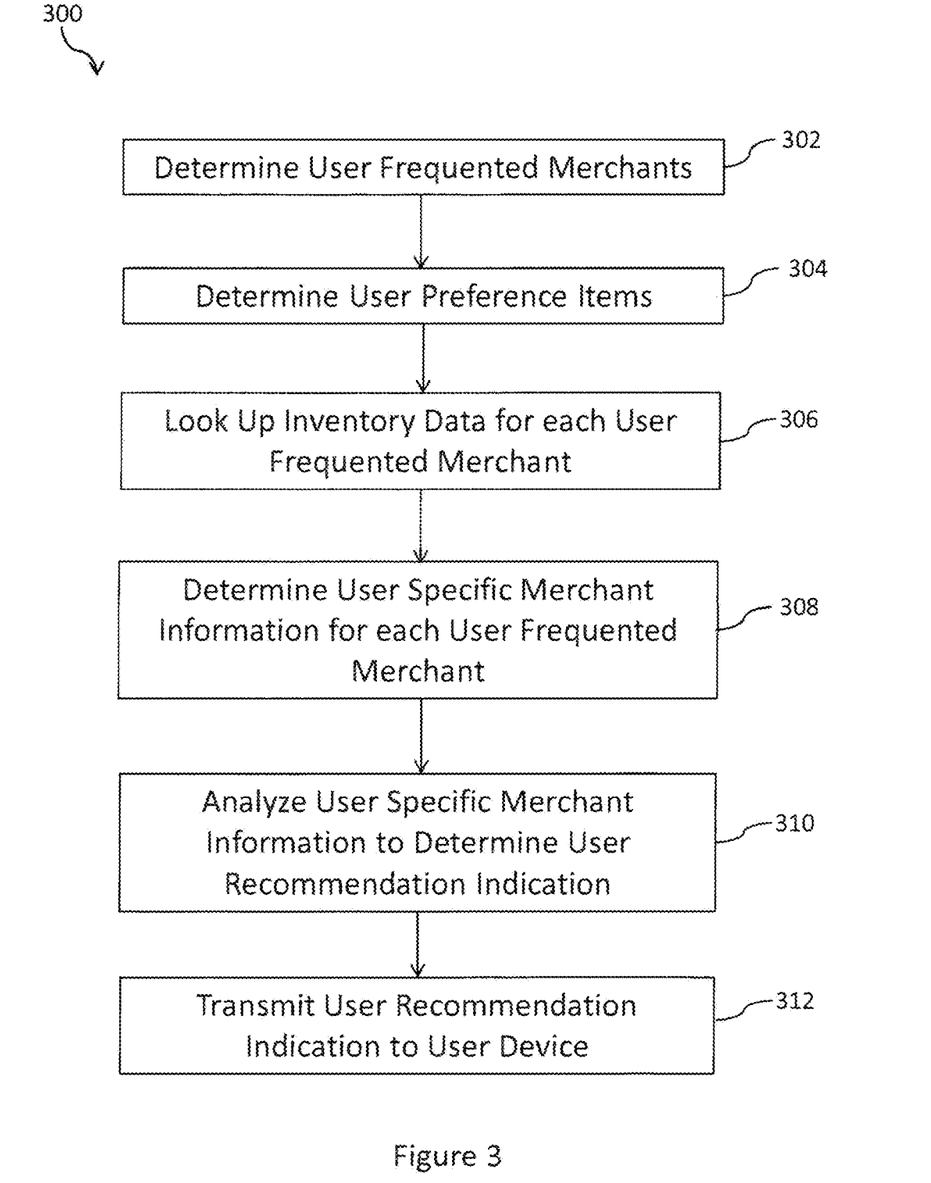
FIG. 3 is a flowchart showing a method of providing a user recommendation of a merchant according to an embodiment of the present invention.

FIG. 3 is a flowchart showing a method of providing a user recommendation of a merchant according to an embodiment of the present invention;

In step 302, the user frequented merchant determination module 224a of the user specific data provision server 110 determines the user frequented merchants 114 from the user data 112. Step 302 may involve receiving transaction data from the payment card transaction data repository 130 for payments made using a payment card or a number payment cards associated with the user. As discussed above, the payment transaction data includes merchant identifiers and by extracting these merchant identifiers, the user frequented merchants can be determined.

In step 304, the user preference item determination module 224b of the user specific data provision server 110 determines the user preference items 116 from the user data 112. Step 304 may involve analysing image data received from the user device 120. In such cases the image data comprises images of user preference items captured by the camera 122 of the user device 120. The result of the analysis in step 304 is item identifiers such as stock keeping units (SKUs) for the user preference items.

In step 306, the merchant inventory data look up module 224c of the user specific data provision server 110 looks up merchant inventory data 142 for each of the user frequented merchants 114.

In step 308, the user specific merchant information determination module 224d of the user specific data provision server 110 determines data such as price data, and/or availability data of the user preference items at each of the user frequented merchants. This data is referred to in the present disclosure as user specific merchant information.

In step 310, the user specific merchant information analysis module 224e of the user specific data provision server 110 analyses the user specific merchant information. The analysis in step 310 may comprise determining if all of the user preference items are available from the user frequented merchants. Additionally or alternatively, the analysis in step 310 may comprise determining a total price for the user preference items at the user frequented merchants. Based on this analysis of the user specific merchant information, the user specific merchant information analysis module generates user recommendation of a merchant from among the user frequented merchant. This recommendation may indicate the merchant from the user frequented merchants that optimizes the total price of the user preference items or the merchant which has all or most of the user preference items available.

In step 312, the user device communication module 224g of the user specific data provision server 110 transmits the user recommendation to the user device 120.

Various operations of an exemplary method 400 will now be described with reference to FIG. 4 in respect of providing a user alert. The user alert may indicate a change in status of one or more of the user preference items at one of the user frequented merchants. For example the user alert may indication that one of the user preference items is out of stock at one of the user frequented merchants. In some implementations, the method 400 may be carried out for a single user frequented merchant, in other implementations, the method 400 may be carried out for multiple user frequented merchants. It should be noted that enumeration of operations is for purposes of clarity and that the operations need not be performed in the order implied by the enumeration.

Figure 4:
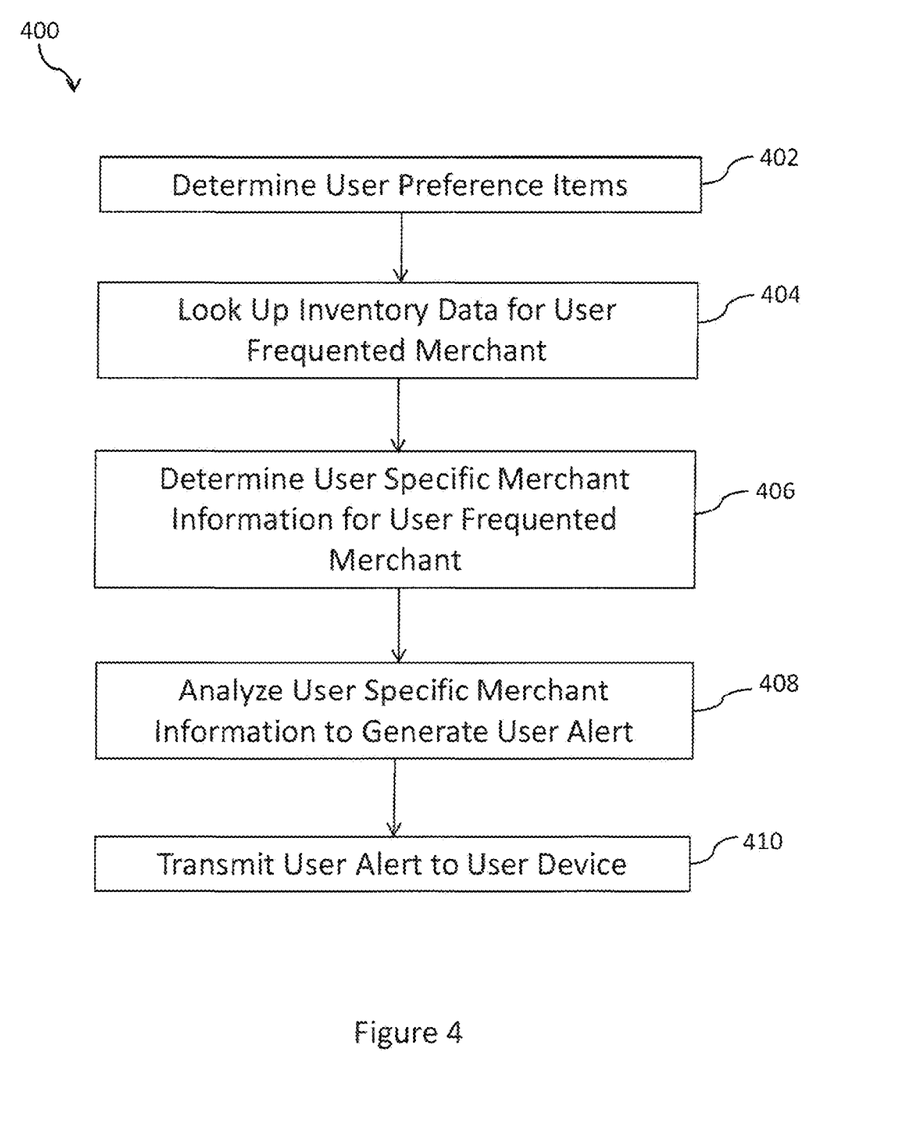
FIG. 4 is a flowchart showing a method of providing a user alert according to an embodiment of the present invention.

FIG. 4 is a flowchart showing a method of providing a user alert according to an embodiment of the present invention.

In step 402, the user preference item determination module 224b of the user specific data provision server 110 determines the user preference items 116 from the user data 112. Step 402 may involve analysing image data received from the user device 120. In such cases the image data comprises images of user preference items captured by the camera 122 of the user device 120. The result of the analysis in step 402 is item identifiers such as stock keeping units (SKUs) for the user preference items.

In step 404, the merchant inventory data look up module 224c of the user specific data provision server 110 looks up merchant inventory data 142 for a user frequented merchant 114. As mentioned above, the method 400 may be carried out for one of the user frequented merchants, or may be carried out for multiple merchants. The method may be carried out for a subset of the user frequented merchants or all of the user frequented merchants.

In step 406, the user specific merchant information determination module 224d of the user specific data provision server 110 determines data such as availability data of the user preference items at the user frequented merchant(s) under consideration. This data is referred to in the present disclosure as user specific merchant information.

In step 408, the user specific merchant information analysis module 224e of the user specific data provision server 110 analyses the user specific merchant information. The analysis in step 408 comprises determining if an alert condition is met for any of the user preference items at the user frequented merchant. The alert condition may be that the user preference items are out of stock or that there has been a change in a price of the user preference item. If the alert condition is met, the user specific merchant information analysis module 224e of the user specific data provision server 110 generates an alert. The alert comprises an indication of the user preference item and an indication of the alert condition. For example the alert may indicate an item, for example as an item description and/or item image and an indication of the condition, for example, the item is out of stock.

In step 410, the user device communication module 224g of the user specific data provision server 110 transmits the alert to the user device 120.

Various operations of an exemplary method 500 will now be described with reference to FIG. 5 in respect of providing item image data to a user. The method 500 may take place while the user is visiting a merchant. The method 500 allows a user to match their user preference items to images of actual physical items on sale at the merchant. It should be noted that enumeration of operations is for purposes of clarity and that the operations need not be performed in the order implied by the enumeration.

Figure 5:
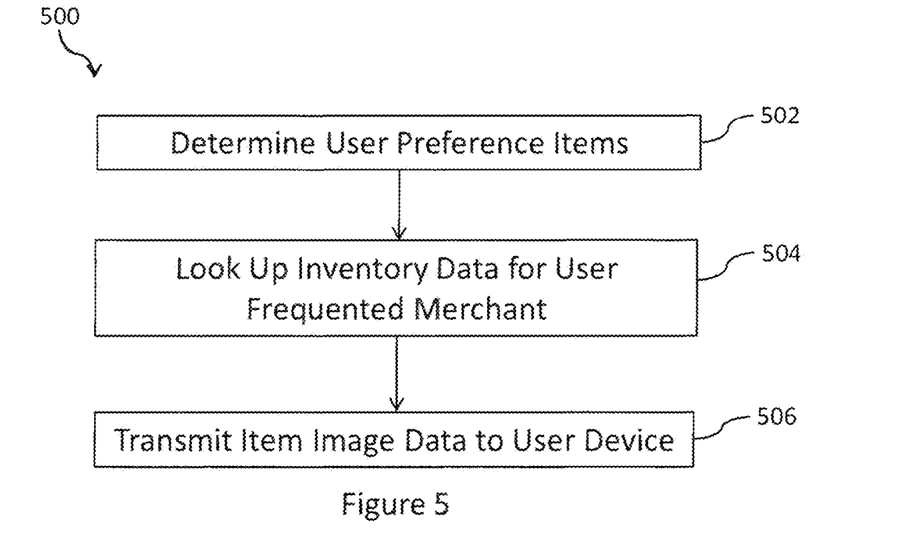
FIG. 5 is a flowchart showing a method of providing item image data to a user device according to an embodiment of the present invention.

FIG. 5 is a flowchart showing a method of providing item image data to a user device according to an embodiment of the present invention.

In step 502, the user preference item determination module 224b of the user specific data provision server 110 determines the user preference items 116 from the user data 112. As described above with reference to FIGS. 3 and 4, this step may involve analysing image data received from the user device 120. In such cases the image data comprises images of user preference items captured by the camera 122 of the user device 120. The result of the analysis in step 502 is item identifiers such as stock keeping units (SKUs) for the user preference items.

In step 504, the merchant inventory data look up module 224c of the user specific data provision server 110 looks up inventory data 142 for the user frequented merchant which the user is visiting. Here the inventory data 142 which is looked up comprises image data for each of the user preference items. The inventory data may also comprise additional information such as price information and/or availability information for the user preference items.

In step 506, the user device communication module 224g of the user specific data provision server 110 transmits item image data for the user preference items to the user device 120. The additional information mentioned in the paragraph above may also be transmitted to the user device 120.

Various operations of an exemplary method 600 will now be described with reference to FIG. 6 in respect of providing a visual rendering of a store shelf to a user. The method 600 provides a user with a visual rendering of the locations of the user preference items in a store for online ordering. It should be noted that enumeration of operations is for purposes of clarity and that the operations need not be performed in the order implied by the enumeration.

Figure 6:
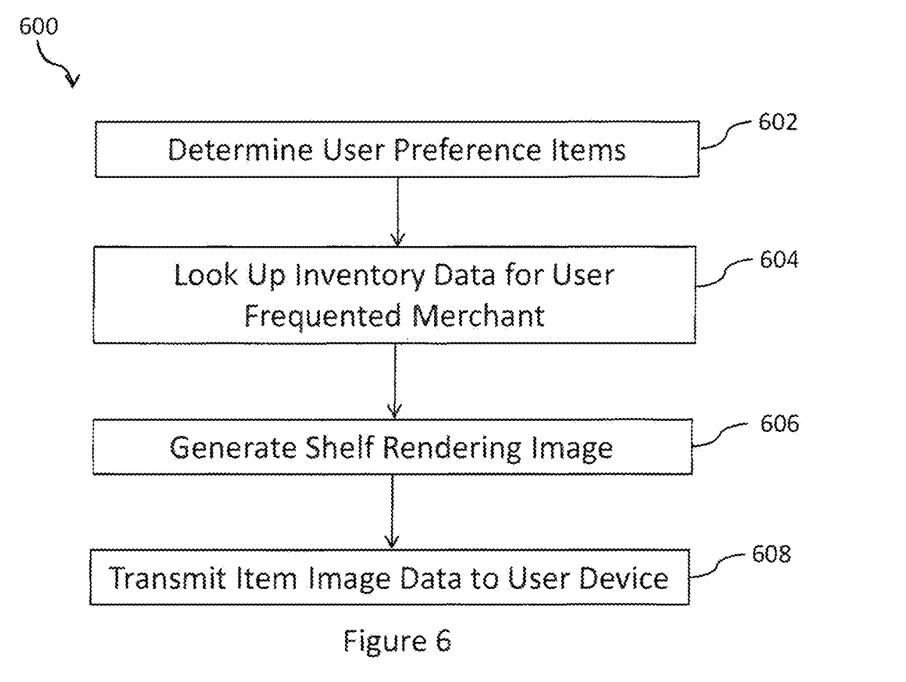
FIG. 6 is a flowchart showing a method of generating a shelf rendering image and providing the shelf rendering image to a user device according to an embodiment of the present invention.

FIG. 6 is a flowchart showing a method of generating a shelf rendering image and providing the shelf rendering image to a user device according to an embodiment of the present invention.

In step 602, the user preference item determination module 224b of the user specific data provision server 110 determines the user preference items 116 from the user data 112. Step 602 may involve analysing image data received from the user device 120. In such cases the image data comprises images of user preference items captured by the camera 122 of the user device 120. The result of the analysis in step 602 is item identifiers such as stock keeping units (SKUs) for the user preference items.

In step 604, the merchant inventory data look up module 224c of the user specific data provision server 110 looks up merchant inventory data 142 for a user frequented merchant 114. In this implementation, the merchant inventory data 142 comprises images of the shelves at the merchant and image of items. The data looked up in step 604 may include item location indications for the user preference items.

In step 606, the shelf rendering image generation module 224f of the user specific data provision server 110 generates a shelf rendering image using the looked up images.

In step 606, the user device communication module 224g of the user specific data provision server 110 transmits item shelf rendering image to the user device 120. The user device 120 may implement an application which presents the shelf rendering image to the user as part of an on-line ordering application.

Whilst the foregoing description has described exemplary embodiments, it will be understood by those skilled in the art that many variations of the embodiment can be made within the scope and spirit of the present invention.

What is claimed is:

1. An apparatus for providing user specific data to a user, the apparatus comprising:
   a computer processor; and
   a data storage device storing instructions that when executed by the computer processor, direct the apparatus to:
      receive user data from a payment card repository;
      analyze user data associated with a user to determine a set of user frequented merchants for the user by extracting merchant identifiers from transaction data for a payment card associated with the user, each user frequented merchant having an associated merchant identifier, wherein the user data comprises the transaction data for the payment card associated with the user and images captured by a camera of a device associated with the user, the images containing items associated with the transaction data;
      analyze the user data associated with the user, including the transaction data and the images containing the items associated with the transaction data, to determine a set of user preference items for the user;
      look up inventory data located in a merchant inventory data repository for each merchant in the set of user frequented merchants, using the associated merchant identifier, and determine user specific merchant information from the inventory data, the inventory data including recent images of inventory at each merchant in the set of user frequented merchants, the user specific merchant information comprising information for each of the user preference items at that merchant;
      analyze the user specific merchant information for each of the merchants, including the recent images of inventory at each merchant in the set of user frequented merchants, to determine a user recommendation indication; and
      transmit the user recommendation indication to a device associated with the user.

2. An apparatus according to claim 1, wherein the user specific merchant information comprises price information for each of the user preference items at that merchant, and wherein the instructions further direct the apparatus to:
   analyze the user specific merchant information to determine the user recommendation indication by determining a merchant from the set of user frequented merchants with an optimized price for the set of user preference items.

3. An apparatus according to claim 1, wherein the user specific merchant information comprises availability information for each of the user preference items at that merchant.

4. An apparatus according to claim 1, wherein the instructions further direct the apparatus to:
   receive user preference item indications from the device associated with the user, and wherein the user data comprises the user preference item indications.

5. An apparatus according to claim 4, wherein the user preference item indications comprise images of items, and wherein the instructions further direct the apparatus to:
   determine the set of user preference items for the user by applying an image recognition algorithm to the images to determine item identifiers from the images.

6. A computer-implemented data processing method of providing user specific data to a user, the method comprising:
   receiving user data from a payment card repository;
   analyzing user data associated with a user to determine a set of user frequented merchants for the user by extracting merchant identifiers from transaction data for a payment card associated with the user, each user frequented merchant having an associated merchant identifier, wherein the user data comprises the transaction data for the payment card associated with the user and images captured by a camera of a device associated with the user, the images containing items associated with the transaction data;
   analyzing the user data associated with the user, including the transaction data and the images containing the items associated with the transaction data, to determine a set of user preference items for the user;
   for each merchant in the set of user frequented merchants, using the associated merchant identifier to look up inventory data located in a merchant inventory data repository for that merchant and determining user specific merchant information from the inventory data, the inventory data including recent images of inventory at each merchant in the set of user frequented merchants, the user specific merchant information comprising information for each of the user preference items at that merchant;
   analyzing the user specific merchant information for each of the merchants, including the recent images of inventory at each merchant in the set of user frequented merchants, to determine a user recommendation indication; and
   transmitting the user recommendation indication to a device associated with the user wherein at least the steps of analyzing user data and analyzing the user specific merchant information are performed by one or more computer processors.

7. A method according to claim 6, wherein the user specific merchant information comprises price information for each of the user preference items at that merchant, and wherein analyzing the user specific merchant information to determine the user recommendation indication comprises determining a merchant from the set of user frequented merchants with an optimized price for the set of user preference items.

8. A method according to claim 6, wherein the user specific merchant information comprises availability information for each of the user preference items at that merchant.

9. A method according to claim 6, further comprising receiving user preference item indications from the device associated with the user, and wherein the user data comprises the user preference item indications.

10. A method according to claim 9, wherein the user preference item indications comprise images of items, and wherein analyzing the user data to determine the set of user preference items for the user comprises applying an image recognition algorithm to the images to determine item identifiers from the images.

11. A non-transitory computer-readable medium having stored thereon program instructions for causing at least one processor to:
- receive user data from a payment card repository;
- analyze user data associated with a user to determine a set of user frequented merchants for the user by extracting merchant identifiers from transaction data for a payment card associated with the user, each user frequented merchant having an associated merchant identifier, wherein the user data comprises the transaction data for the payment card associated with the user and images captured by a camera of a device associated with the user, the images containing items associated with the transaction data;
- analyze the user data associated with the user, including the transaction data and the images containing the items associated with the transaction data, to determine a set of user preference items for the user;
- look up inventory data located in a merchant inventory data repository for each merchant in the set of user frequented merchants, using the associated merchant identifier, and determine user specific merchant information from the inventory data, the inventory data including recent images of inventory at each merchant in the set of user frequented merchants, the user specific merchant information comprising information for each of the user preference items at that merchant;
- analyze the user specific merchant information for each of the merchants, including the recent images of inventory at each merchant in the set of user frequented merchants, to determine a user recommendation indication; and
- transmit the user recommendation indication to a device associated with the user.

12. The computer-readable medium of claim 11, wherein the user specific merchant information comprises price information for each of the user preference items at that merchant, wherein the program instructions to analyze the user specific merchant information to determine the user recommendation indication cause the at least one processor to determine a merchant from the set of user frequented merchants with an optimized price for the set of user preference items.

13. The computer-readable medium of claim 11, wherein the user specific merchant information comprises availability information for each of the user preference items at that merchant.

14. The computer-readable medium of claim 11, further comprising instructions for causing the at least one processor to receive user preference item indications from the device associated with the user, and wherein the user data comprises the user preference item indications.

15. The computer-readable medium of claim 14, wherein the user preference item indications comprise images of items, and wherein the program instructions that cause the at least one processor to analyze the user data to determine the set of user preference items for the user comprise applying an image recognition algorithm to the images to determine item identifiers from the images.

* * * * *